United States Patent Office 3,803,253
Patented Apr. 9, 1974

3,803,253
HYDROISOMERIZATION OF DIMETHYLNAPH-
THALENES USING A CALCIUM ZEOLITE
CATALYST
George Suld, Springfield, and Ralph L. Urban, Newtown
Square, Pa., assignors to Sun Research and Develop-
ment Co., Philadelphia, Pa.
No Drawing. Filed Dec. 14, 1971, Ser. No. 208,001
Int. Cl. C07c 15/24
U.S. Cl. 260—668 A                    10 Claims

ABSTRACT OF THE DISCLOSURE

A process for hydroisomerization of dimethylnaph-
thalenes (DMN's), or of hydrogenated DMN's, com-
prises contacting said DMN's or hydrogenated DMN's
with hydrogen (e.g., 15–1500 p.s.i.g.) in the presence of
a combination of a hydrogenation catalyst and a calcium
containing zeolite catalyst (preferably in the range of
10–100% crystalline and of the faujasite structure) at
a temperature in the range of 300–500° C. (preferably
in vapor phase) and at a liquid hourly space velocity in
the range of 0.25–10 (preferably 0.5–3). The preferred
calcium containing zeolite has an atomic ratio Al/Si in
the range of 0.35–1.0 in the alumino-silicate framework.
The more preferred zeolites are synthetic faujasites having
an Al/Si framework ratio in the range of 0.35 to 0.65
(e.g., Linde Type Y). When the feed comprises at least
one member from the 2,6- or 2,7-DMN families the
process can produce isomers both within and between the
2,6- and 2,7-DMN families.

CROSS REFERENCES TO RELATED APPLICATIONS

United States application, Ser. No. 7,273, filed Jan. 30,
1970, of John A. Hedge (now U.S. 3,668,267, issued
June 6, 1972), discloses a method for separation of 2,6-
DMN from 2,7-DMN by adsorption on certain molecular
sieve zeolites. United States application Ser. No. 99,280
of George Suld and Ralph L. Urban, now U.S. Pat.
3,721,717, describes a pulse microreactor which can be
used for experimental work relative to the present in-
vention. United States application No. 716,190, filed
Mar. 26, 1968, of Kirsch, Barmby and Potts discloses
methods for activation of zeolite catalysts to control
"water" content. The following application, filed the
same day as the present application, describes certain
catalysts and processes for isomerization, disproportion-
ation and hydroisomerization of dimethylnaphthalenes:

Serial No. 207,870, Inventor, John A. Hedge, Title, Isom-
erization and/or Transalkylation and/or Dispropor-
tionation of Alkylnaphthalenes.

The entire disclosure of these copending applications is
hereby incorporated herein by this reference.

BACKGROUND OF THE INVENTION

It has been reported [J. Org. Chem. 29, 2939 (1964)]
that three independent dimethylnaphthalene (DMN)
family groups exist among the 10 DMN isomers. These
families are depicted below:

2,6-⇌1,6-⇌1,5-DMN
2,7-⇌1,7-⇌1,8-DMN
2,3-⇌1,3-⇌1,4-DMN

Although DMN's are freely isomerizable within the
individual groups, in the presence of an acid catalyst,
there is no interconversion of DMN's between the fami-
lies. This phenomenon, not predictable a priori on the
basis of alkylbenzene chemistry is a consequence of high
energy barriers for the intermolecular 1,2-methyl shift be-
tween the adjacent β-β'-positions as well as between the
rings of the naphthalene nucleus.

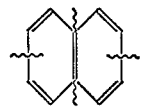

The height of the energy barriers is a direct function
of the π-electronic structure of the naphthalene nucleus
and the specific reaction mechanism underlying the intra-
molecular 1,2-alkyl shift.

SUMMARY OF THE INVENTION

A process for hydroismerization of dimethylnaphtha-
lenes (DMN's) or of hydrogenated DMN's (e.g., Tetralins,
Decalins), comprises contacting said DMN's or hydro-
genated DMN's with hydrogen (e.g., 15–1500 p.s.i.g.) in
the presence of a combination of a hydrogenation catalyst
and a calcium containing zeolite catalyst (preferably in
the range of 10–100% crystalline and of the faujasite
structure) at a temperature in the range of 300–500° C.
(preferably in vapor phase) and at a liquid hourly space
velocity in the range of 0.25–10 (preferably 0.5–3). The
preferred calcium containing zeolite has an atomic ratio
Al/Si in the range of 0.35–1.0 in the alumino-silicate
framework. The more preferred zeolites are snythetic
faujasites having an Al/Si framework ratio in the range of
0.35 to 0.65 (e.g., Linde Type Y). The process can pro-
duce isomers both within and between the 2,6- and 2,7-
DMN families.

Hydrogenation of one of the rings of the naphthalene
nucleus results in the formation of a benzenoid derivative
of naphthalene-Tetralin and correspondingly lifting of the
migrational barriers for the 1,2-methyl shift in the remain-
ing aromatic nucleus, e.g.:

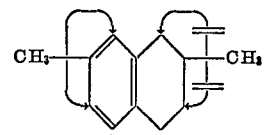

The present invention involves hydroisomerization of
dimethylnaphthalenes using a polyfunctional zeolite cata-
lyst which is capable of both hydrogenation-dehydrogena-
tion of the two rings in a dimethylnaphthalene nucleus and
can also catalyze the intramolecular 1,2-methyl shift, thus
lift the rigid β-β' energy barriers in the naphthalene
nucleus.

This catalyst, a combination of a calcium-containing
faujasite and a hydrogenation-dehydrogenation catalyst
component, possesses a proper activity balance between
the hydrogenation and isomerization functions.

This bi-functional zeolitic catalyst having this unique
combination of properties is a calcium exchanged syn-
thetic faujasite (e.g., a Type Y molecular sieve (preferably
impregnated with a Pd-Pt salt) which upon contact with
hydrogen converts to the metal or metal hydride).

In one embodyment the feed to the process contains at
least one dimethylnaphthalene (DMN) from the 2,6-
DMN or 2,7-DMN families, or a mixture of two or more
such DMN's in non-equilibrium concentration (at the
reaction temperature) and the space velocity (or reac-
tion time) and pressures ($H_2$ and total) are selected so
as to obtain a hydroisomerization product which contains
all of the members of the 2,6-DMN 2,7-DMN families in
relative concentrations which are closer to the concentra-
tions which would be present at thermodynamic equilibrium at the reaction temperature, assuming equal thermodynamic concentrations for the said members at the reaction temperature.

FURTHER DESCRIPTION

In the preferred Ca alumino-silicate zeolite catalyst, at least 20% and, preferably, at least 40% (typically 60 to about 80%) of the electronegativity associated with the alumino-silicate framework is satisfied by cations of calcium or of its oxides or hydroxides. We further prefer that the Ca catalyst contains less than one alkali metal cation (e.g., Na$^+$) for every 4 aluminum atoms in the alumino-silicate framework. Preferably, the alumino-silicate zeolite is at least 10% crystalline (by X-ray analysis) and is chemically characterized by the empirical formula $M_x(AlO_2)_x(SiO_2)_y \cdot (H_2O)_z$, where $x$, $y$ and $z$ are integers, the ratio $x/y$ being from 1.0 to 0.2 and where M is chosen from at least one of the following groups:

(1) at least one cation of Ca$^{+2}$ or Ca$^+$-O-Ca$^+$ for every 8 atoms of aluminum in the alumino-silicate framework of said zeolite;
(2) at least one cation of Ca(OH)$^+$ for every 4 atoms of aluminum in the alumino-silicate framework of said zeolite;
(3) a combination of the members of at least two of the above groups;

and wherein the balance of the cations necessary for electronic equivalency comprises H$^+$ or cations of metals, metal oxides, or metal hydroxides and wherein there is less than one alkali metal cation for every four atoms of aluminum in the alumino-silicate zeolite, more preferably, less than one alkali metal cation for every ten atoms of aluminum.

The preparation of such Ca containing zeolites is well known. A typical procedure comprises aqueous exchange of a sodium faujasite (e.g., Linde Type Y) with calcium ions (as with an aqueous calcium chloride). More preferred is to first exchange a sodium faujasite with aqueous ammonium ions until the resulting ammonium-zeolite contains less than one cation of sodium for every four atoms of aluminum in the framework (more preferred less than one sodium cation for every 10 or 20 atoms of aluminum). The resulting ammonium-zeolite can then be exchanged with calcium ions to produce the desired calcium-containing zeolite. Upon activation, as by heating in air, water is removed and any residual ammonium ions decompose to form "protonic" or "cation deficient" sites. The symbol CaNH$_4$Y is sometimes used to denote a predominantly calcium-ammonium-Y zeolite (of low sodium content) and after activation, the resulting cation deficient zeolite can be denoted as "CaHY." However, it should be noted that, depending upon activation conditions, the calcium can be present in a number of cationic forms, e.g., HOCa$^+$ or Ca$^{+2}$ and the hydrogen in the zeolite may be protonic or hydroxyl. Whether in one or a combination of such forms, any Ca, or CaH, containing zeolite of the type described herein can be useful in the process of this invention.

The Ca zeolite can contain minor amounts of such additional cations as the cations of magnesium, aluminum, silver, nickel, zinc, cerium, godolinium, lanthanum and mixtures of these cations. In such catalysts, there could be on the order of one such cation present for every 20 atoms of aluminum in the alumino-siilcate framework of said zeolite.

For most hydrocarbon conversions, the ratio $x/z$ in the empirical formula of a zeolite is preferably in the range of 0.25 to 6. If excess water is present, the zeolite can be "activated" by heating according to the procedure disclosed in the aforementioned application of Kirsch, Barmby and Potts. If the zeolite is deficient in "bound" water, such water can be added, as by exposure to steam in air or nitrogen.

As used herein, the term "framework," in reference to the alumino-silicate portion of the zeolite (which can be crystalline or amorphous), excludes those aluminum ions which are in exchange positions and which are neutralizing some of the negative charge associated with the aluminum atoms in the alumino-silicate tetra-hedra of the zeolite. Note that aluminum in the alumino-silicate framework can be either trigonal or tetrahedral.

The zeolite catalyst is used in combination with from 0.05 to 25% (more preferably, 0.05 to 5%) of a hydrogenation catalyst component containing a hydrogen-active metal such as platinum, palladium, rhodium, rhenium, ruthenium, molybdenum, cobalt or nickel (or a chemical compound, as an oxide, hydride or sulfide, of such a metal). The hydrogen-active metal can also be incorporated on a carrier (as alpha-alumina, microporous silica, conventional amorphous silica-alumina cracking catalyst, or acid-exchanged clays, such as montmorillonites or kaolin). When the hydrogen-active metal component (or a chemical compound of the metal) is so incorporated on a carrier, it is preferred that the Ca zeolite be physically admixed therewith. The more preferred catalyst combination comprises a Ca containing Type Y zeolite which has been impregnated or exchanged with a salt of Pt or Pd. For example, the hydrogenation catalyst can be selected from the group consisting of platinum, platinum hydride, palladium, nickel, nickel oxide, nickel sulfide, molybdenum oxide, molybdenum sulfide, cobalt oxide, platinum oxide, palladium oxide, and mixtures thereof. The hydrogenation catalyst can be physically admixed with the acidic alumino-silicate, or have been incorporated into the alumino-silicate by salt impregnation or by ion exchange. When the salt has been introduced into the alumina-silicate catalyst by ion exchange, it is preferred that the hydrogenation catalyst be reduced, as with hydrogen, prior to contact of the catalyst with the hydrocarbon feed. Also preferred is the process wherein the Ca zeolite/hydrogenation catalyst combination and from 15–1500 p.s.i.g. of hydrogen are present in the reactor. The hydrogen can be recycled at rates up to 10,000 s.c.f./bbl. of feed. The LHSV is preferably in the range of 0.25–5.0 volumes of feed per volume of catalyst per hour.

If, at a given reaction temperature, the catalyst activity appreciably decreases during the course of the reaction, an increase in reaction temperature can often be used to prolong effective catalyst life. Alternatively, the catalyst can be separated from the hydrocarbon reactants and regenerated, as by burning in air. After such burning, water can be added to the catalyst, as by exposure to hydrogen or to steam in air or nitrogen. It is sometimes advantageous to reduce the regenerated catalyst combination with hydrogen, preferably at 250° to 800° F., prior to introduction of the alkylnaphthalene feed. Such a regeneration process can be like that described in copending application Ser. No. 185,615, filed Oct. 1, 1971, of Alfred E. Hirschler.

Illustrative Examples

The operation of the hydroisomerization process is illustrated by the following example:

Example 1

Into a vertical stainless steel catalyst tube (4" x 0.25" O.D., 0.18" I.D.) was placed 0.100 g. of a 80–100 mesh sized commercially aavilable Co$^{2+}$-Pd/Y catalyst (available commercially as Linde SK310). The catalyst was reduced with hydrogen at 360° C., hydrogen flow was adjusted to 100 ml./min. and a 30 microliter pulse of a 20 wt. percent 2,7-DMN solution in benzene was injected into the reactor (which was at 360° C.). The effluent product was analyzed in a gas-liquid phase chromatograph unit attached directly to the outlet of the reactor. The product distribution (after removal of the "front end," i.e., products boiling below methylnaphthalenes follows:

| | Weight percent |
|---|---|
| 1-methylnaphthalene | 2.3 |
| 2-methylnaphthalene | 5.3 |
| 2,6-DMN | 9.8 |
| 1,6-DMN | 12.1 |
| 2,7-DMN | 37.2 |
| 1,7-DMN | 31.4 |
| 1,5-; 2,3-; +1,4- | 1.9 |

The products lighter than DMN were less than 10 weight percent of the charge; therefore, little hydrocracking occurred.

From the above data it may be seen that about 50% of the thermodynamic composition equilibrium between the 2,7-, 1–7 and 2,6-, 1,6-DMN families assuming equal thermodynamic concentrations for the four isomers at the reaction temperature, was obtained in one pass. The overall selectively for DMN's was 80–85%. In a continuous flow or a partial recycle-recirculating reactor, a complete equilibration of the 2,7- and 2,6-DMN family isomers can be obtained. By extrapolation of this data to all 10 DMN isomers it can be shown that all the isomer families can be equilibrated with each other. By removal of the solid isomers (2,6- and 2,7-DMN's) followed by either selective extraction of 2,7- with HF–BF (U.S. 3,155,738) or eutectic breaking with molecular sieves (see Ser. No. 7,273) one can convert other DMN isomers to the usually desired 2,6-isomer.

A typical analysis (in weight percent) for the Linde SK310 catalyst (anhydrous basis) follows:

| | |
|---|---|
| $SiO_2$ | 65.6±0.5. |
| $Al_2O_3$ | 22.3±0.5. |
| $Na_2O$ | 1.8±0.2. |
| $CaO$ | 10.3±0.3. |
| $Cl^-$ | Less than 0.05. |
| $F^-$ | Less than 0.05. |
| Pd | 0.5±0.02. |
| Bulk density | 0.65 g./cc. |
| Surface area | Greater than 500 M.$^2$/g. |

Note that this analysis indicates that about 70% of the exchange capacity of the zeolite is satisfied by $Ca^{+2}$, about 10% by sodium, and, by difference, about 20% by "protons" or hydrogen.

Example 2

Example 1 was repeated except that the catalyst was Linde SK200.

The product distribution (after removal of products boiling below DMN's) follows:

| | |
|---|---|
| 2,6-DMN | 3.9 |
| 2,7-DMN | 79.1 |
| 1,6-DMN | 3.4 |
| 1,7-DMN | 13.0 |
| Other DMN's | 0.6 | less than about 5% of the charge was converted to products boiling lower than the dimetyhlnaphthalenes; therefore, little hydrocracking occured. The SK 200 catalyst is similar to the SK310 except that platinum is the hydrogenation-dehydrogenation component (rather than the palladium in the SK310). This example shows that the combination of platinum and a calcium containing zeolite will catalyze isomerization between the 2,6- and 2,7-DMN families but that the catalyst combination containing palladium is considerably more active for this reaction.

A number of multivalent cations can yield useful catalysts for disproportionation, isomerization, hydroisomerization and transalkylation when exchanged with the sodium of a sodium form crystalline alumino-silicate having uniform pure openings between about 5 and about 15A. All or a portion of the exchangeable sodium can be exchanged with salts of one (or a combination) of the metals listed below, (which are multivalent and thus capable of forming Me(OH) sites for Bronsted acidity). Furthermore, many have multiple oxidation states useful in reactions involving oxidation-reduction mechanisms. The more preferred of these preferred metals are: Cr, Mn, Fe, Co, Ni, Cu, Ag, Zn, Cd, Al, Ge, Sn, and Pb. Less preferred metals are Ti, V, Nb, Mo, Tc, Hf, Ta, W, Re, Au, Hg, Ga, In, Tl, Sb, and Bi, which can also be used to produce metal-exchanged molecular sieves. Also useful are members of the actinide family (which have more recently become available for catalytic purposes by recovery from spent nuclear reactor fuel). These include Ac, Th, Pa, V, Np and Pu.

The potential usefulness of any of these metal exchanged molecular sieves is linked with water content of the activated sieve. Each of these sieves can have a different water content vs. activation temperature profile and must be evaluated at or near their optimum water contents, (which can be determined by "screening run" experiments).

The metal-exchanged zeolites listed above have sufficient acidity to catalyze isomerization reactions of alkylaromatics such as the isomerization of 1,6-DMN to 2,6-DMN, Isomerization of methylindans to Tetralins can also be done with these catalysts. These catalysts can be useful in other acid catalyzed processes such as isomerization, disproportionation, cracking, reforming, alkylation, and polymerization.

Any of the above molecular sieves can be further exchanged with rare earths, or impregnated with platinum group metals to improve activity in isomerization and/or hydroisomerization of dimethylnaphthalenes and for disproportionation of alkylnaphthalenes.

Isomerization of mixed dimethyl Decalins (DMD's) using HF—BF$_3$ AlCl$_3$—HCl, and AlBr$_3$—HBr is known. (e.g., see U.S. 3,243,469 to A. Schneider, issued Mar. 29, 1966). Trans-trans 2,6-DMD is the highest melting isomer and can be crystallized from the isomerized mixture. The remaining liquid isomers are recycled to the isomerization. Thus all dimethylnaphthalene isomers can be converted to the desired 2,6-DMN via this DMD isomerization route.

The catalysts and process steps described herein can also be used for isomerization of dimethyl Decalins. Our objective was to isomerize a dimethyl Decalin mixture to increase the amount of trans, syn-2-syn-6-dimethyl Decalin (TSS-2,6-DMD). This isomer can be removed by low temperature crystallization (e.g., see U.S. 3,541,175 to Hedge, issued Nov. 17, 1970) and the remaining dimethyl Decalins can then be re-equilibrated.

Isomerization rates of dimethyl Decalins with RE–Y (i.e., rare earth exchanged Type Y zeolite) sieves at 190° C. were much slower than for dimethylnaphthalenes. Furthermore, the desired TSS-2,6-DMD isomer was found to be present in significantly lower amounts at 190° C. Only about 13% TSS-2,6-DMD is present at equilibrium at 230° C. versus about 25% TSS-2,6-DMD.

For example, 2,7-dimethyl Decalin (2,-DMD) can be isomerized at 190° C.) by rare earth exchanged Type Y molecular sieve (e.g., Linde SK500). The isomerized DMD mixture upon dehydrogenation over Pd on carbon contains:

| | Percent |
|---|---|
| 1+2 ethylnaphthalene | 7.0 |
| 2,6-DMN | 21.5 |
| 2,7-DMN | 21.5 |
| Other DMN's | 43.0 |
| 2,3-DMN | 7.0 |

Note that this conversion is not possible with dimethylnaphalenes since the 2,6-DMN and 2,7-DMN families are not interconvertible. The isomerizate is water white; thus, sieve life between recycles may be considerably longer than for the 1,6-DMN to 2,6-DMN isomerization described in the present application. Hydrogen pressure (e.g., 15–15,000 p.s.i.) can also be used to prolong catalyst life.

A single isomer was used in the run described above in order to facilitate analysis. However, the process can involve isomerization of the entire mixed DMD stream obtained by hydrogenation of a 495–518° F. heart cut from an extract of catalytic gas oil.

Other acidic zeolies can also isomerize DMD's. Decationized zeolites and metal exchanged zeolites are examples of such acidic zeolites. Water content of these sieves may be critical for desired activity, as determined by screening runs.

A wide range of temperatures are applicable. The hydrocarbon can be in liquid or vapor or mixed (e.g., trickle) phase. Rate of catalyst deactivation vs. desired conversion rate will govern the optimum operating temperature and reaction time.

The above disclosed "Decalin" isomerization (or hydroisomerization) is the invention of Johan A. Hedge and George Suld.

Isomerization, or hydroisomerization, using a (zeolite catalyst) of the methyl group on the aromatic ring of three dimethyl Tetralin isomers yields 2,6-dimethyl Tetralin (2,6-DMT). This is the invention of George Suld and John A. Hedge.

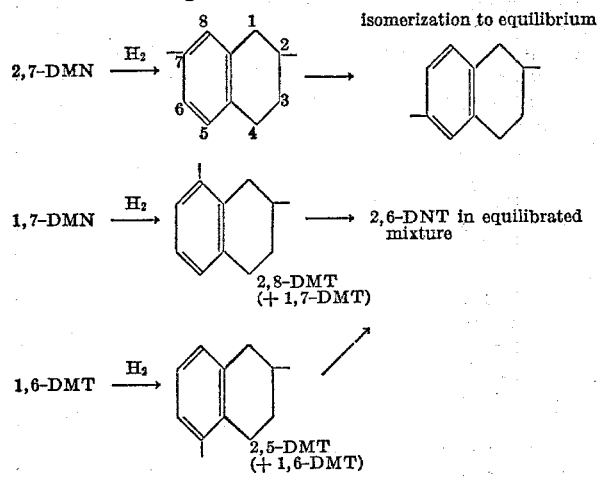

Catalysts with HF–BF$_3$ at 20–70° C. or with acidic zeolites (e.g., 190°–250° C.) is effective for this isomerization.

Approximately 30–33% 2,6-DMT is present in the equilibrium mixture at 28° C. starting with pure, 2,7-DMN, or 1,7-DMN. With mixed DMT's from a dimethylnaphthalene concentrate, other DMT isomers which are not convertible to 2,6-DMT are present, and the amount of 2,6-DMT in the isomerizate is only 25% greater than in the charge (from 13.6% in the charge up to 17.3% 2,6-DMT in the isomerizate).

Isolation of 2,6-dimethylnaphthalene (2,6-DMN) from the isomerizate can involve either (1) crystallizing out 2,6-DMT and then dehydrogenating or (2) dehydrogenating the entire DMT isomerizate and then crystallizing out 2,6-DMN.

The biphenyl route to 2,6-DMN can consist of:

(1) Hydrogenation of biphenyl to dicyclohexyl
(2) Isomerization of dicyclohexyl (as with a zeolite) to mixed dimethyl Decalins
(3) Crystallization of trans-syn-2-syn-6-dimethyl Decalin (TSS-2,6-DMD) with recycle of filtrate to the isomerization step
(4) Dehydrogenation of TSS-2,6-DMD to 2,6-DMN AlCl$_3$-sludge catalyst at 50° C. can give the desired equilibration reaction within 2 hours. Since only 15 wt. percent free TSS-2,6-DMN is produced in each isomerization, there is preferably, a recycle of 85% of the isomerizate from the filtration step back to the isomerization step. Thus, the capacity of the isomerization vessel controls production.

Dehydrogenation studies show that fresh unmodified RD–150 Pt on alumina catalyst is suitable if neat DMD's are charged to the reactor. Product purities of 95–98% can be achieved after distillation of small amounts of unconverted DMD's. Catalyst life exceeded 10 volumes of hydrocarbon even in a nonpressurized system. New rhenium-platinum reforming catalysts now available should make this step operable with 100 p.s.i. pressure (vs. 400 p.s.i. estimated for RD–150).

The invention claimed is:

1. A process for hydroisomerization of a feed consisting essentially of a dimethylnaphthalene or a hydrogenated dimethylnaphthalene or a non-equilibrium mixture thereof, comprising contacting said feed with hydrogen and a combination of a hydrogenation-dehydrogenation catalyst and a calcium containing aluminosilicate zeolite, said contacting being at a temperature in the range of 300–500° C., at a liquid hourly space velocity in the range of 0.25–10, and at a pressure in the range of 15–1500 p.s.i.

2. Process of claim 1 wherein said feed contains at least one dimethyl naphthalene (DMN) selected from 2,6-DMN, 1,6-DMN, 1,5-DMN, 2,7-DMN, 1,7-DMN and 1,8-DMN, or a mixture of two or more of said DMN's.

3. Process according to claim 2 wherein said feed is relatively lean with respect to 2,6-DMN and rich with respect to one or more members of the 2,7-DMN family and wherein the resulting hydroisomerization product is enriched with respect to 2,6-DMN.

4. Process of claim 2 wherein said hydrogenation-dehydrogenation catalyst comprises platinum or palladium or a compound thereof.

5. Process of claim 2 wherein said zeolite is in the range of 10–100% crystalline by X-ray analysis.

6. Process of claim 5 wherein said crystalline portion of said zeolite has an alumino-silicate framework of the faujasite cage structure.

7. Process of claim 6 wherein said framework has an Al/Si ratio in the range of 0.35–0.65.

8. Process of claim 1 wherein at least 20% of the electronegativity associated with said alumino-silicate is satisfied by Ca$^{+2}$, Ca$^+$—O—Ca$^+$ or Ca(OH)$^+$.

9. Process of claim 8 wherein said zeolite contains less than one alkali metal cation for every four aluminum atoms in said alumino-silicate.

10. Process of claim 7 wherein said hydrogenation-dehydrogenation catalyst comprises 0.05–25 weight percent of platinum, palladium or of a chemical compound of platinum or palladium and wherein said zeolite contains less than one alkali metal cation for every four aluminum atoms in said framework and at least 40% of the electronegativity associated with said framework is satisfied by at least one member selected from Ca$^+$, Ca$^+$—O—Ca$^+$, and Ca(OH)$^+$.

References Cited

UNITED STATES PATENTS

| | | | |
|---|---|---|---|
| 3,409,685 | 11/1968 | Donaldson et al. | 260—668 A |
| 3,409,686 | 11/1968 | Mitsche | 260—668 A |
| 3,249,644 | 5/1966 | Hahn | 260—668 F |
| 3,256,353 | 6/1966 | Shuman et al. | 260—668 F |
| 3,637,881 | 1/1972 | Williams et al. | 260—668 A |

CURTIS R. DAVIS, Primary Examiner

U.S. Cl. X.R.

260—668 F